(12) United States Patent
Gunda et al.

(10) Patent No.: US 11,748,019 B2
(45) Date of Patent: Sep. 5, 2023

(54) METHOD TO EFFICIENTLY TRANSFER SUPPORT AND SYSTEM LOGS FROM AIR-GAPPED VAULT SYSTEMS TO REPLICATION DATA SOURCES BY RE-UTILIZING THE EXISTING REPLICATION STREAMS

(71) Applicant: EMC IP Holding Company LLC, Hopkinton, MA (US)

(72) Inventors: Kalyan C. Gunda, Bangalore (IN); Jagannathdas Rath, Bengaluru (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/452,359

(22) Filed: Oct. 26, 2021

(65) Prior Publication Data
US 2023/0125145 A1  Apr. 27, 2023

(51) Int. Cl.
*G06F 3/06* (2006.01)

(52) U.S. Cl.
CPC .............. *G06F 3/065* (2013.01); *G06F 3/062* (2013.01); *G06F 3/0683* (2013.01)

(58) Field of Classification Search
CPC .................. G06F 3/062; G06F 3/0683; G06F 3/0647–065
See application file for complete search history.

(56) References Cited

U.S. PATENT DOCUMENTS

| | | | |
|---|---|---|---|
| 11,061,786 B1* | 7/2021 | Miller | G06F 3/0619 |
| 2004/0172511 A1* | 9/2004 | Furuumi | G06F 3/0614 711/162 |
| 2007/0150795 A1* | 6/2007 | King | G06T 1/20 714/781 |
| 2019/0146884 A1* | 5/2019 | Gangadharappa | G06F 11/0778 711/162 |
| 2019/0205215 A1* | 7/2019 | Littlefield | G06F 3/0641 |
| 2020/0057567 A1* | 2/2020 | Hutcheson | G06F 9/45558 |

* cited by examiner

*Primary Examiner* — Chie Yew
(74) *Attorney, Agent, or Firm* — Workman Nydegger

(57) ABSTRACT

One example method includes, at a replication data source, initiating a replication process that includes transmitting a replication stream to a replication destination vault, and data in the replication stream is transmitted by way of a closed airgap between the replication data source and the replication destination vault, switching, by the replication data source, from a transmit mode to a receive mode, receiving, at the replication data source, a first checksum of a file, and the first checksum and file were created at the replication destination vault, receiving, at the replication data source, the file, calculating, at the replication data source, a second checksum of the file, and when the second checksum matches the first checksum, ending the replication process.

20 Claims, 3 Drawing Sheets

METHOD TO EFFICIENTLY TRANSFER SUPPORT AND SYSTEM LOGS FROM AIR-GAPPED VAULT SYSTEMS TO REPLICATION DATA SOURCES BY RE-UTILIZING THE EXISTING REPLICATION STREAMS

FIELD OF THE INVENTION

Embodiments of the present invention generally relate to communications with air-gapped vault systems. More particularly, at least some embodiments of the invention relate to systems, hardware, software, computer-readable media, and methods for transferring support and system logs from air-gapped vault systems to replication data sources by re-utilizing the existing replication streams.

BACKGROUND

Ransomware and cyber-attacks have become very common today with lots of datacenters and customer IT infrastructure and backup infrastructure getting attacked and wiped out completely, leaving nothing to restore. This has led to the evolution of different protection mechanisms to counter these attacks, such as cyber recovery solutions, and ransomware protection solutions. Most of these solutions utilize technologies such as replication, retention locking and air-gapped vault backup servers to store additional locked data, not easily accessible to outside world.

One such example is Dell Cyber Recovery Solution (CRS), where data from a primary backup server is frequently replicated to a different vault backup server. This vault is air-gapped, and the airgap may close only when replication happens, thereby protecting the vault from any other outside access. Also, in the vault, the replicated data may be retention locked for a certain duration to prevent it from corruption or destruction in case attackers gain access to the vault. In such approaches, the air gap closes periodically only for replication here and data flows from source to destination vault system and then the air-gap opens again.

While air-gapped vaults and associated systems have proven effective in limiting unauthorized access to data contained in the vault, the inherent nature of such vaults has given rise to various problems. For example, while the air-gapped vault systems cannot be accessed from the outside world, it is also the case that the vault system cannot, due to the air gap which provides security from attackers, send any kind of data to the outside world. For example, the vault is unable to send data such as support logs, support bundles, diagnostic logs, health monitor logs, to the outside world, that is, entities outside of the vault. For better, and for worse, the vault is practically cut off from the outside world.

To illustrate, many applications have a facility where the applications regularly upload relevant logs and reports, such as Dell DataDomain Autosupport (ASUP) reports, to the home servers, such as Nagios or Kibana dashboards, for health checks and other analysis. However, it is not possible to upload to vault systems because the vault systems are not allowed, and not able, to communicate with the home servers. As such, it may be very difficult to monitor and analyze the air-gapped vault systems in a detailed manner and on a regular basis.

In more detail, when a primary system wants to replicate data to a vault, the airgap separating the primary system from the vault closes only for the replication protocol/streams to replicate the data. Once the data is replicated from the primary system to the vault, the airgap opens and the vault is again completely cut off from the primary system and other external systems. When the air-gap is closed for replication, it is only for a particular port, and only the replication data can pass through the air-gap. Further, while the airgap is temporarily closed for replication, no other process can send, or receive, any data through the airgap in any direction.

Instead, the only way to send the logs and reports back from the vault to a primary system would be to allow a new process in the destination vault to pass through the airgap and send the logs and reports from the vault to the source system, home servers, or other entities outside the vault. However, such an approach is not desirable, at least because it would introduce a serious vulnerability in the airgap which can be exploited by attackers to enter into the vault and destroy, steal, or corrupt, the data in the vault.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
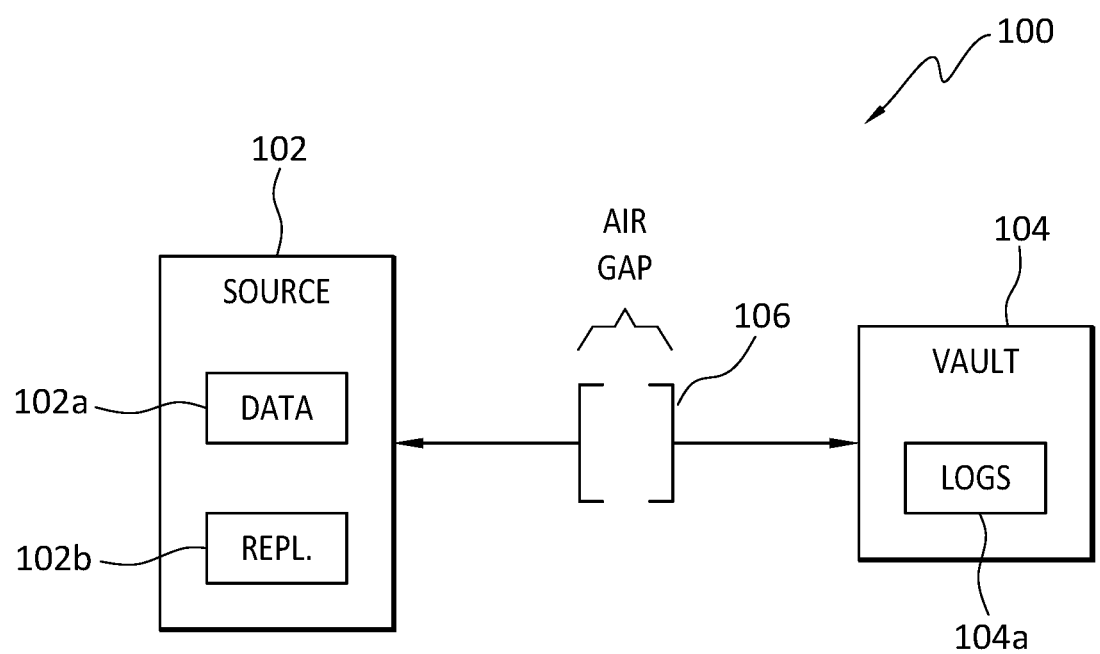
FIG. 1 discloses aspects of an example operating environment for some embodiments of the invention.

Embodiments of the present invention generally relate to communications with air-gapped vault systems. More particularly, at least some embodiments of the invention relate to systems, hardware, software, computer-readable media, and methods for transferring support and system logs from air-gapped vault systems to replication data sources by re-utilizing the existing data streams between the vault and another system, such as a replication stream transmitted to the vault by a replication system. In some embodiments, data may be transmitted, within a replication process, by the vault to a replication data source.

In general, example embodiments of the invention may provide an efficient method to transfer the system related or diagnostic logs and/or other important system related logs or files of the vault system, which may be a replication destination, to the source system without violating the airgap restrictions.

In more detail, a data replication process from a source to a destination such as a vault may operate in different phases such as, for example, initiation of the replication process, determination of what data will be replicated, transmission of the data from the source to the destination, and completion of the replication process. For data replication in an airgap environment, that is, where an airgap is provided between the source and the destination, the last operation at the destination system is that once the destination system detects that replication is complete, the destination system may close the replication port, and then reestablish the airgap between the destination system and the source system.

Such a replication process and replication framework may, in example embodiments, include various other phases as well. Particularly, some example embodiments may include a Pickup-Send-Phase that may be executed in the destination system, after all the data is transferred from the source to the destination vault system. Example embodiments may further provide a Pickup-Receive-Phase that may be executed in the replication system after the replication system has sent all the data to the destination vault system. Generally, the Pickup-Send-Phase and Pickup-Receive phase may enable use of the existing replication stream to piggyback logs, reports, and other data, from the destination back to the source. In this way, the data transfer from the destination to the source may be implemented only via an allowed port, and within the replication process itself.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that a destination vault may be able to communicate information to a source system without compromising the security of the vault and without violating airgap requirements. An embodiment may be able to communicate information from a vault system to a source without implementing a new communication process between the vault and the source. An embodiment may enable monitoring of a vault without compromising the security of the vault. An embodiment may prevent tampering with logs and other information as they are sent from the vault to the source. An embodiment may enable use of a replication stream to send information from a vault to a source. Various other advantages of example embodiments will be apparent from the disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of An Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, operations in which data is transmitted between/among two or more entities. Such operations may include, but are not limited to, data replication operations. One of the entities may be air gapped such that when the airgap is established, that entity is not able to communicate with any other external entity. Data communicated between the entities may include, but is not limited to, files, logs, and reports.

The scope of the invention is not limited to any particular types of data communicated between entities. Thus, as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

With particular attention now to FIG. 1, one example of an operating environment for embodiments of the invention is denoted generally at 100. In general, the operating environment 100. The operating environment 100 may include one or more sources 102. In general, a source 102 may comprise any entity, comprising hardware and/or software, that is able to transmit a data stream, such as a replication stream for example, to one or more other entities. In some instances, the source 102 may replicate data 102a residing at the source 102, to another entity. Thus, a source 102 may include a replication application 102b to create and transmit replication datasets. Finally, the data 102a may, or may not, be created/modified at the source 102.

The example operating environment 100 may also include a destination system, such as a vault 104, comprising hardware and/or software, that is configured for selective communication with the source 102. The vault 104 may be a standalone entity, or may be an element of a larger system. The vault 104 may include information, which may or may not be generated by the vault 104, that is to be transmitted to the source 102. Such information may include, but is not limited to, logs 104a.

As further indicated in the example of FIG. 1 an airgap interface 106 may be provided that, except during certain processes when the airgap interface 106 is temporarily closed, prevents the vault 104 from communicating with any other external entity, including the source 102. An airgap may be referred to herein as being 'open' or in an 'open' state, meaning that an airgap has been established between two entities such that the entities are not able to communicate with each other. As well, an airgap may referred to herein as being 'closed' or in a 'closed' state, meaning that the airgap between two entities has been disestablished, or closed, such that the two entities are able to communicate with each other.

The airgap interface 106 may be physical and/or virtual. For example, in some embodiments, the vault 104 must be physically connected to the source 102 in order for the source 102 to communicate with the vault 104. In other embodiments, the vault 104 may employ a software-implemented airgap interface 106 that isolates the vault 104 from any communication with external entities, except in specified circumstances.

In at least some embodiments, the source 102 and the vault 104 may communicate bi-directionally with each other by way of the airgap interface 106 when an airgap of the airgap interface 106 is closed. For example, the source 102 may transmit a data stream to the vault 104 by way of the airgap interface 106 when the airgap is closed, and the vault 104 may transmit data to the source 102 by way of the airgap interface 106 when the airgap is closed. No communication between the source 102 and the vault 104 is possible when the airgap of the airgap interface 106 is open.

In some embodiments, the default state of the airgap of the airgap interface 106 is 'open.' That is, in the 'open' default state of the airgap, no communication is possible between the vault 104 and the source 102.

B. Aspects of Some Example Embodiments

B.1 Background

As noted, example embodiments may be employed in connection with data replication processes, although that is not necessarily required. In general, a replication process may work in different phases including: 'Initiate the Repl process'; 'Figure out what data to send'; 'Send the data'; and 'complete the Repl process.' For example, one possible process flow may be: (i) Start Replication Process; (ii) Send Seg Refs; (iii) Receive list of unique Refs; and (iv) Send the unique segments (data); (v) repeat process until all unique segments are sent to dest; and (vi) Complete Repl process. For data replication in an air-gapped environment, the last operation in the destination system may be that once the destination system detects that data replication is complete, the destination system may close the 'Repl Port' and reestablish the airgap.

B.2 Pickup-Send-Phase and Pickup-Receive-Phase

Figure 2:
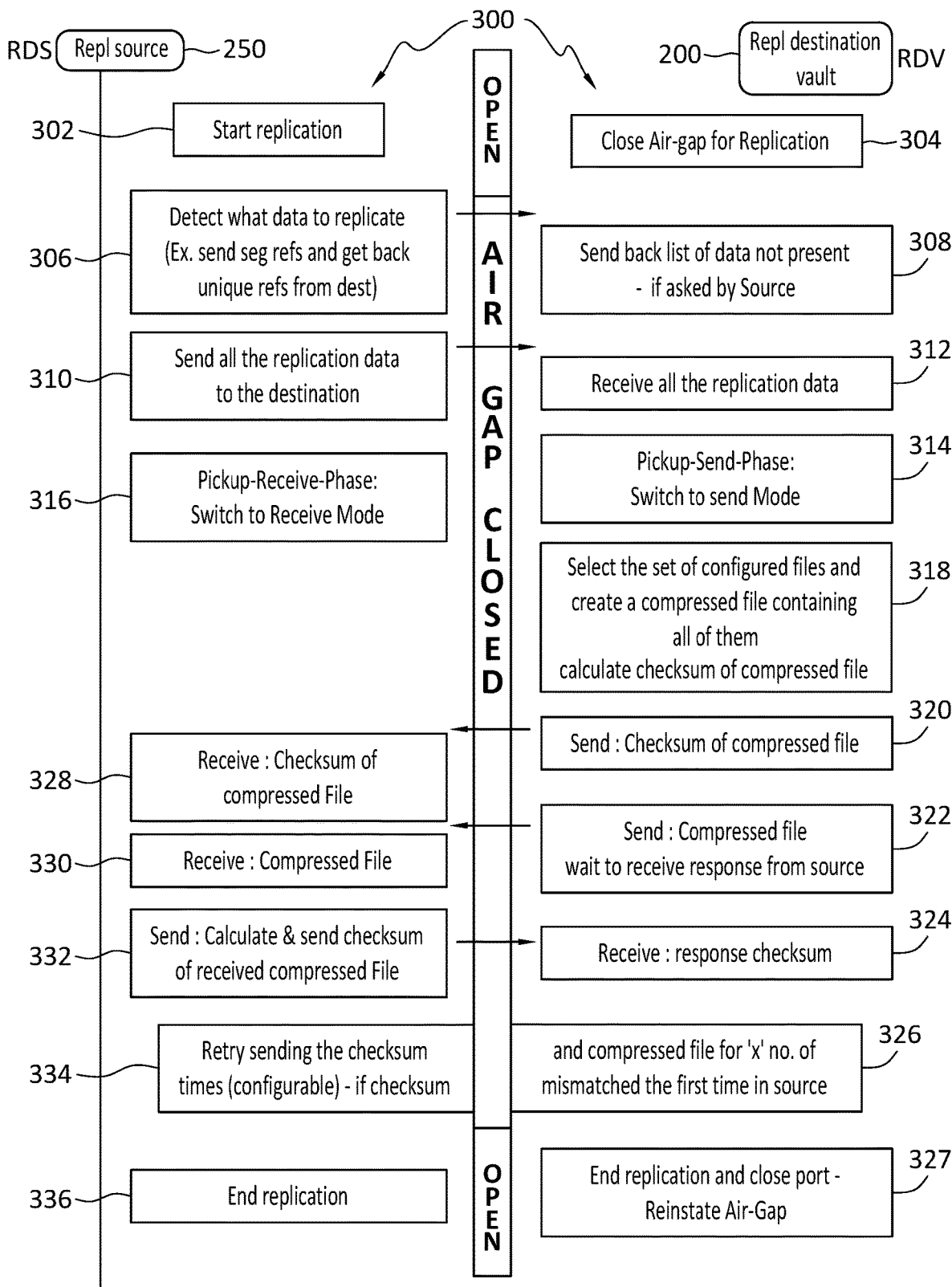
FIG. 2 discloses aspects of an example method according to some embodiments of the invention.

With reference now to FIG. 2, and with continuing reference to FIG. 1, example embodiments embrace, among other things, a data replication framework that includes a Pickup-Send-Phase (PSP) and a Pickup-Receive-Phase (PRP). In general, the Pickup-Send-Phase may be executed in a replication destination vault (RDV) 200, one example of which is the vault 104 for example (FIG. 1), after all the data has been transferred from the source to the destination vault system. The Pickup-Receive-Phase may be executed in a replication data source (RDS) 250, such as the source 102 for example (FIG. 1), after the RDS 250 has sent all the replication data to the RDV 200. Note that in some embodiments, PSP may be employed only for replication destination systems that are air-gapped vaults. The replication destination system implementation may have an identification property, such as a flag for example, indicating whether or not it is a vault. As further indicated in the example of FIG. 2, the RDV 200 and the RDS 250 may be separated by an airgap interface 275 that includes or defines an airgap that may be selectively closed and opened by the RDS 250 and/or by the RDV 200. In some embodiments, only the RDV 200 is able to close, and open, the airgap of the airgap interface 275.

As shown in FIG. 2, an airgap of the airgap interface 275 may initially be open at the instantiation of the method 300. That is, an airgap may exist between the RDV 200 and the RDS 250 such that communication between those two entities is prevented.

The method 300 may begin at 302 when the RDS 250 starts replication of data to the RDV 200. At about the same time, the RDV 200 may close the airgap 304 so as to enable communication between the RDV 200 and the RSS 200. Since the RDV 200 and RDS 250 are unable to communicate when the airgap is open, the RDV 200 and the RDS 250 may have respective synchronized clocks, or other devices, so that the RDV 200 knows when to close the airgap. When the airgap is closed, the RDV 200 may so notify the RDS 250.

Next, the RDS 250 may detect 306 what data to replicate to the RDV 200. For example, the RDS 250 may send segment references to the RDV 200 and receive, as a response from the RDV 200, respective unique references for each of the segment references. In some embodiments, the RDV 200 may send 308 to the RDS 250 a list of any data segments not present at the RDV 200. The operation 308 may be performed in response to a query from the RDS 250. In this way, the RDS 250 may avoid replicating segments to the RDV 200 that are already present at the RDV 200 and may, later, send to the RDV 200 only segments that are not already present at the RDV 200.

Next, the RDS 250 may send 310 the replication data, which may then be received 312 by the RDV 200. As noted, the replication data that is sent 310 may omit any segments that were determined to already exist at the RDV 200. By only sending unique segments at 310, bandwidth may be conserved, and the replication process may proceed relatively more quickly than if all segments were sent by the RDS 250 to the RDV 200.

When the RDV 200 detects that all data has been replicated from the RDS 250, the RDV 200 may then switch 314 to the PSP and trigger a pickup process. As well, when the RDS 250 has finished sending 310 all the data, the RDS 250 may switch 316 to a PRP and wait for a checksum value and a payload from the RDV 200. The operations 314 and 316 may be performed at the same time, or at about the same time, although performance at any of these times is not necessarily required. The example method 300 may use the existing data replication stream between the RDV 200 and the RDS 250 to piggyback the required logs and other data from the RDV 200 back to the RDS 250. In this way, the data transfer between the RDV 200 and RDS 250 may happen only via the allowed port, which may only be available for communications when the airgap is closed, and within the replication process 302-310 itself.

B.3 Replication Destination Vault (RDV) System—Pickup-Send-Phase (PSP)

With continued reference to FIG. 2, the PSP may begin with selection 318 of a pre-configured set of files in the RDV

200. These pre-configured files may include information, data, and metadata, indicating the health or state of the RDV 200. Thus, the pre-configured files may comprise, for example, general system logs, diagnostic logs, health logs, process outputs, and support bundles.

This list of files or directories (full path or directory path) may be configured in the RDV 200 and stored persistently and in-memory. In some embodiments, these files may only be files such as type logs, stats, metrics, health state, perf logs, and audit logs. The method 300, and particularly the operation 318, may implement appropriate filters or validators for sensitive directories or files which would not be sent back even if they are requested by the RDS 250.

Continuing with the PSP 314, particularly the operation 318, the selected logs and files may be bundled 318 by/during the PSP314 together in a directory and the directory then compressed to create a single pickup bundle file, which may be a compressed binary file. The compression employed at 318 may be any kind of compression algorithm such as, for example, ZIP, BZIP2, or LZ, depending upon the availability of those compression algorithms in the RDV 200. At 318, a checksum may be calculated for this compressed file using, for example, MD5, SHA1, or SHA2.

The method 300 may then continue to 320 where the RDV 200 may send the checksum value, possibly as an array of a fixed number of bytes, and then send this compressed file 322 back to the waiting RDS 250.

The RDV 200 may then wait for confirmation 322 from the RDS 250 that the correct data has been received at the RDV 200. This confirmation may be implemented through the use of a checksum comparison, as discussed in further detail below. In general however, the RDV 200 may expect the same checksum value to be received 324 back from RDS 250 as an acknowledgement that the RDV 200 has received the data correctly that was sent 310 by the RDS 250. For example, if the RDS 250 sends back a special checksum, such as 0x1111111 for example, that checksum may indicate that the data was not correctly received 312 at the RDV 200. In this case, that is, when there is a checksum mismatch, the RDV 200 may then resend 326 the same checksum and compressed file one more time. However, the method 300 may provide for a configurable value for the number of retries 326.

It is noted that there may be scenarios where no log files are configured for pickup in the RDV 200. In that case, the RDV may send back a special checksum, such as 0x00000000 for example, to the RDS 250 indicating that there are no logs to send. In this case, the RDV 200 may then end the replication process, and open the airgap, without waiting for any response from the RDS 250.

B.4 Replication Data Source
(RDS)—Pickup-Receive-Phase (PRP)

With continued reference to FIG. 2, further details are provide concerning various operations of the method 300 that may be performed by the RDS 250. As noted earlier, the RDV 200 may send 320 a checksum that was calculated at 318. This checksum may then be received by the RDS 250. It would first receive 328 the checksum value, possibly as an expected number of bytes. Next, the RDS 250 may receive 330 the compressed file that was created 318 by the RDV 200. While not specifically indicated in FIG. 2, the RDS 250 may send, to the RDV 200, an acknowledgement of receipt of the compressed file. Note that if the RDS 250 receives 328 the special 0x000000 checksum value, that means that the RDV 200 is not going to send any log files and, as such, the method 300 may terminate at this point.

Otherwise, after the RDS 250 has received 330 the compressed file, the RDS 250 may then calculate 332 the checksum of the received compressed file bytes, and compare the calculated 322 checksum with the checksum received 328 earlier from the RDV 200. If the checksums match, then the RDS 250 may proceed to write the compressed file in a pre-configured location, which may hold all such received files from the RDV 200. As well, the RDS 250 may also, as part of 322, send back the same checksum value as a response to the RDV 200 indicating that all logs from the RDV 200 have been received at the RDS 250, and replication can then complete 336.

On the other hand, if the checksums do not match, then the RDS 250 may notify the RDV 200 accordingly, and again wait to receive 334, from the RDV 200, the set of checksum and compressed file one more time. With regard to the notification of the checksum mismatch, the RDS 250 may send the 0x111111111, or other kind of special checksum value, to indicate that the data received by the RDV 200 is bad, that is, that data is not the same as the data that was sent 310 by the RDS 250. After receiving 328/330 the logs a second time, the RDS 250 may perform the same checksum check 332 and if the checksums match on this iteration, the RDS 250 may write the compressed file, received 330 from the RDV 200, to disk, which may be a local disk at the RDS 250. If there is no checksum match after 'n' iterations (2 in this example case), the RDS 250 may log proper error messages and raise alerts/notifications to an administrator, indicating that a mismatch was identified. At this point, replication may terminate 336.

In the event that the RDV 200 sends the logs, in the compressed file, back to the RDS 250 and receives the confirmation from the RDS 250, the RDV 200 may 327 end the replication, close the port to reinstate the airgap, that is, open the airgap so that no further communication can take place between the RDS 250 and RDV 200. Note that the operations of 327 may also be performed by the RDV 200 when there are no logs to send back to source.

Note that after the RDS 250 has received the compressed file from the RDV 200, any application or process in the RDS 250 may then process the received compressed file from the RDV 200 by decompressing the compressed file, and then analyze or process the logs and files obtained from the decompressed file. Additionally, or alternatively, to the analyzing and processing, the RDS 250 may upload the logs/files to another entity, such as a log server for example.

As will be apparent from the discussion of FIG. 2, for example, example embodiments of the invention may intelligently re-uses an existing data replication stream for which the airgap has been closed. More specifically, such embodiments may transmit logs from a destination vault using the same data replication stream and session that is being used by a data source to transmit data to, and communicate with, the destination vault.

C. Further Discussion

As will be apparent from this disclosure, example embodiments may comprise a variety of useful aspects and advantages, one example of which is that example embodiments may not require the airgap policies, which may govern the configuration, operation, and/or use, of the airgap, to be relaxed in any manner to allow a new process to pass through the airgap to send back the logs from the destination to the source.

As another example, embodiments may intelligently piggyback the relevant logs/files from the destination and sends those logs/files back to the source system using the same replication stream that was used by the destination to receive data from the source.

In another example of aspects of some embodiments, destination systems that are generally cut off from the outside world may nonetheless be monitored in detail with the help of the logs and statistics received periodically from the destination by the source.

In another example, some embodiments may ensure that administrators are able to control what kind of logs would be sent back, from the destination to the source, by way of a data replication process.

Additionally, example embodiments may operate such that the replication streams from the source to the destination cannot be misused. That is, such replication streams may be internally controlled and operated by the software at the source and/or the destination, and no external entity can access, or tamper with, the replication stream from outside.

As a final example of aspects of some embodiments, once all the data is replicated from the source to the destination, the source and destination may simply automatically switch their respective roles from "sender" (source) and "receiver" (destination) to "receiver" (source) and "sender" (destination) respectively, to transfer the logs/system data from the destination to the source. Thus, bidirectional data transfer may occur over a single replication stream between a replication source and a replication destination. That is, and because the same replication stream is being used that was initially used to replicate data from the source to the destination, it may not be possible for attackers to tamper with, or impair, the log transfer in any way.

D. Example Methods

It is noted with respect to the example method of FIG. 2 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

E. Further Example Embodiments

Following are some further example embodiments of the invention. These are presented only by way of example and are not intended to limit the scope of the invention in any way.

Embodiment 1. A method, comprising: at a replication data source, initiating a replication process that comprises transmitting a replication stream to a replication destination vault, and data in the replication stream is transmitted by way of a closed airgap between the replication data source and the replication destination vault; switching, by the replication data source, from a transmit mode to a receive mode; receiving, at the replication data source, a first checksum of a file, and the first checksum and file were created at the replication destination vault; receiving, at the replication data source, the file; calculating, at the replication data source, a second checksum of the file; and when the second checksum matches the first checksum, ending the replication process.

Embodiment 2. The method as recited in embodiment 1, wherein when the airgap is open, the replication data source and the replication destination vault cannot communicate data to, or receive data from, each other.

Embodiment 3. The method as recited in any of embodiments 1-2, wherein the file is a compressed file that includes one or more files, and also includes a log generated by the replication destination vault.

Embodiment 4. The method as recited in any of embodiments 1-3, wherein the first checksum and the file are received at the replication data source by way of an allowed port that is open temporarily for the replication process.

Embodiment 5. The method as recited in any of embodiments 1-4, wherein when the airgap is closed, only the replication process can send or receive data through the airgap.

Embodiment 6. The method as recited in any of embodiments 1-5, wherein receipt of the first checksum and the file occurs within the replication process.

Embodiment 7. The method as recited in any of embodiments 1-6, wherein when the second checksum does not match the first checksum, receiving, at the replication data source, the file and the first checksum again.

Embodiment 8. The method as recited in embodiment 1, further comprising sending, by the replication data source, the second checksum to the replication destination vault.

Embodiment 9. The method as recited in any of embodiments 1-8, wherein the replication stream is not accessible by entities external to the replication data source and the replication destination vault.

Embodiment 10. The method as recited in any of embodiments 1-9, wherein data exchange between the replication data source and the replication destination vault does not require any change to an airgap policy.

Embodiment 11. A method, comprising: closing, by a replication destination vault, an airgap between the replication destination vault and a replication data source; receiving and storing, at a replication destination vault, a replication stream from a replication data source, and data in the replication stream is received at the replication destination vault by way of the airgap; switching, by the replication destination vault, from a receive mode to a transmit mode; selecting, by the replication destination vault, one or more files from the replication stream and compressing the selected files to form a compressed file; calculating a first checksum of the compressed file; sending the first checksum to the replication data source; receiving a second checksum from the replication data source, and when the first checksum matches the second checksum, ending the replication process and opening the airgap.

Embodiment 12. The method as recited in embodiment 11, wherein when the airgap is open, the replication data source and the replication destination vault cannot communicate data to, or receive data from, each other.

Embodiment 13. The method as recited in any of embodiments 11-12, wherein the file includes a log generated by the replication destination vault.

Embodiment 14. The method as recited in any of embodiments 11-13, wherein the first checksum and the file are transmitted to the replication data source by way of an allowed port that is open temporarily for the replication process.

Embodiment 15. The method as recited in any of embodiments 11-14, wherein when the airgap is closed, only the replication process can send or receive data through the airgap.

Embodiment 16. The method as recited in any of embodiments 11-15, wherein transmission of the first checksum and the file occurs within the replication process.

Embodiment 17. The method as recited in any of embodiments 11-16, wherein when the second checksum does not match the first checksum, transmitting, by the replication destination vault, the file and the first checksum again.

Embodiment 18. The method as recited in any of embodiments 11-17, wherein the airgap is opened by closing an allowed port that was used by the replication process.

Embodiment 19. The method as recited in any of embodiments 11-18, wherein the replication stream is not accessible by entities external to the replication data source and the replication destination vault.

Embodiment 20. The method as recited in any of embodiments 11-19, wherein data exchange between the replication data source and the replication destination vault does not require any change to an airgap policy.

Embodiment 21. A method according to any of embodiments 1-10, further comprising: closing, by a replication destination vault, an airgap between the replication destination vault and a replication data source; receiving and storing, at a replication destination vault, a replication stream from a replication data source, and data in the replication stream is received at the replication destination vault by way of the airgap; switching, by the replication destination vault, from a receive mode to a transmit mode; selecting, by the replication destination vault, one or more files from the replication stream and compressing the selected files to form a compressed file; calculating a first checksum of the compressed file; sending the first checksum to the replication data source; receiving a second checksum from the replication data source, and when the first checksum matches the second checksum, ending the replication process and opening the airgap.

Embodiment 22. A method for performing any of the operations, methods, or processes, or any portion of any of these, disclosed herein.

Embodiment 23. A computer readable storage medium having stored therein instructions that are executable by one or more hardware processors to perform operations comprising the operations of any one or more of embodiments 1-22.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
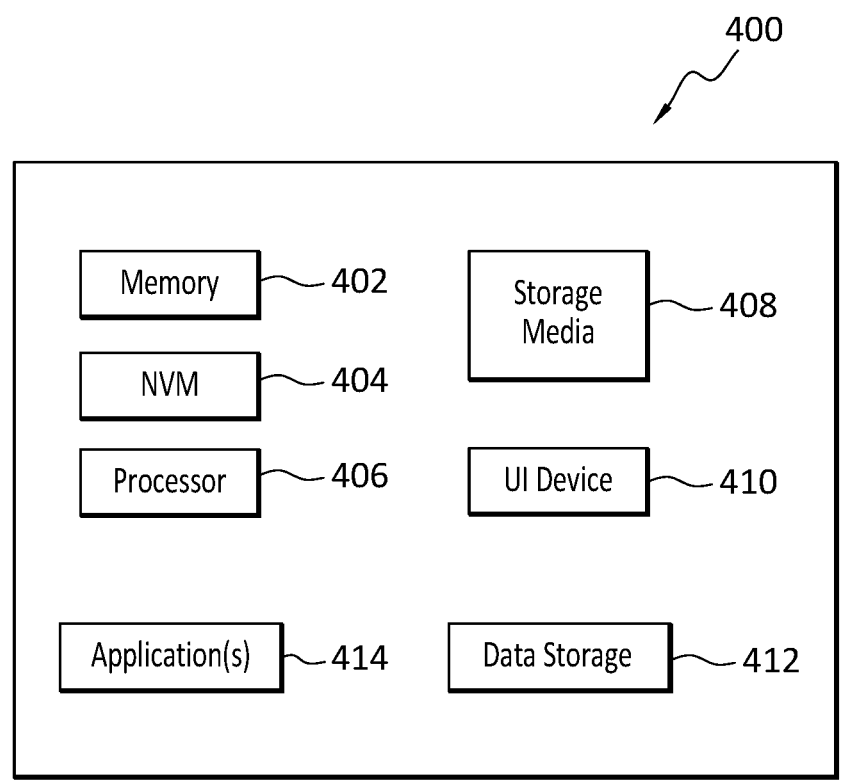
FIG. 3 discloses aspects of an example computing entity operable to perform any of the claimed methods, processes, and operations.

With reference briefly now to FIG. 3, any one or more of the entities disclosed, or implied, by FIGS. 1-2 and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 3.

In the example of FIG. 3, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory computer readable storage medium having stored therein instructions that are executable by one or more hardware processors to perform operations comprising:
at a replication data source, initiating a replication process that comprises transmitting a replication stream to a replication destination vault, and data in the replication stream is transmitted by way of an airgap between the replication data source and the replication destination vault, and the airgap is closed when the data in the replication stream is transmitted between the replication data source and the replication destination vault;
after all the data in the replication stream has been transmitted, switching, by the replication data source, from a transmit mode to a receive mode;
receiving by way of the airgap when the airgap is closed, at the replication data source, a first checksum of a file, and the first checksum and the file were created at the replication destination vault;
receiving by way of the airgap when the airgap is closed, at the replication data source, the file;
calculating, at the replication data source, a second checksum of the file; and
when the second checksum matches the first checksum, ending the replication process.

2. The non-transitory computer readable storage medium as recited in claim 1, wherein when the airgap is open, the replication data source and the replication destination vault cannot communicate data to, or receive data from, each other.

3. The non-transitory computer readable storage medium as recited in claim 1, wherein the file is a compressed file that includes one or more files, and also includes a log generated by the replication destination vault.

4. The non-transitory computer readable storage medium as recited in claim 1, wherein the first checksum and the file are received at the replication data source by way of an allowed port that is open temporarily for the replication process.

5. The non-transitory computer readable storage medium as recited in claim 1, wherein when the airgap is closed, only the replication process can send or receive data through the airgap.

6. The non-transitory computer readable storage medium as recited in claim 1, wherein receipt of the first checksum and the file occurs within the replication process.

7. The non-transitory computer readable storage medium as recited in claim 1, wherein when the second checksum does not match the first checksum, receiving by way of the airgap when the airgap is closed, at the replication data source, the file and the first checksum again.

8. The non-transitory computer readable storage medium as recited in claim 1, wherein the operations further comprise sending by way of the airgap when the airgap is closed, by the replication data source, the second checksum to the replication destination vault.

9. The non-transitory computer readable storage medium as recited in claim 1, wherein the replication stream is not accessible by entities external to the replication data source and the replication destination vault.

10. The non-transitory computer readable storage medium as recited in claim 1, wherein data exchange between the replication data source and the replication destination vault does not require any change to an airgap policy.

11. A non-transitory computer readable storage medium having stored therein instructions that are executable by one or more hardware processors to perform operations comprising:
closing, by a replication destination vault, an airgap between the replication destination vault and a replication data source;
receiving and storing, at a replication destination vault, a replication stream from a replication data source, and data in the replication stream is received at the replication destination vault by way of the airgap;
after all the data in the replication stream has been received, switching, by the replication destination vault, from a receive mode to a transmit mode;
selecting, by the replication destination vault, one or more files from the replication stream and compressing the selected files to form a compressed file;
calculating, by the replication destination vault, a first checksum of the compressed file;
sending, by the replication destination vault, the first checksum to the replication data source;
receiving, by the replication destination vault, a second checksum of the compressed file from the replication data source, and when the first checksum matches the second checksum, ending a replication process that created the replication stream, and opening the airgap.

12. The non-transitory computer readable storage medium as recited in claim 11, wherein when the airgap is open, the replication data source and the replication destination vault cannot communicate data to, or receive data from, each other.

13. The non-transitory computer readable storage medium as recited in claim 11, wherein the compressed file includes a log generated by the replication destination vault.

14. The non-transitory computer readable storage medium as recited in claim 11, wherein the first checksum and the compressed file are transmitted to the replication data source by way of an allowed port that is open temporarily for the replication process.

15. The non-transitory computer readable storage medium as recited in claim 11, wherein when the airgap is closed, only the replication process can send or receive data through the airgap.

16. The non-transitory computer readable storage medium as recited in claim 11, wherein transmission of the first checksum and the compressed file occurs within the replication process.

17. The non-transitory computer readable storage medium as recited in claim 11, wherein when the second checksum does not match the first checksum, transmitting, by the replication destination vault, the compressed file and the first checksum again.

18. The non-transitory computer readable storage medium as recited in claim 11, wherein the airgap is opened by closing an allowed port that was used by the replication process.

19. The non-transitory computer readable storage medium as recited in claim 11, wherein the replication stream is not accessible by entities external to the replication data source and the replication destination vault.

20. The non-transitory computer readable storage medium as recited in claim 11, wherein data exchange between the replication data source and the replication destination vault does not require any change to an airgap policy.

* * * * *